United States Patent
Zierhut

(10) Patent No.: US 6,172,515 B1
(45) Date of Patent: Jan. 9, 2001

(54) BUS COUPLER WITH TRANSFORMER-FREE TRANSMISSION

(75) Inventor: Hermann Zierhut, deceased, late of München (DE), by Ingeborg Zierhut, legal representative

(73) Assignee: Siemens AG, Munich (DE)

( * ) Notice: Under 35 U.S.C. 154(b), the term of this patent shall be extended for 0 days.

(21) Appl. No.: 09/214,570

(22) PCT Filed: Jul. 11, 1997

(86) PCT No.: PCT/EP97/03702

§ 371 Date: Nov. 22, 1999

§ 102(e) Date: Nov. 22, 1999

(87) PCT Pub. No.: WO98/04027

PCT Pub. Date: Jan. 29, 1998

(30) Foreign Application Priority Data

Jul. 17, 1996 (EP) .................................................. 96111538

(51) Int. Cl.⁷ ................................................... H03K 17/16
(52) U.S. Cl. ............................................... 326/26; 326/90
(58) Field of Search ................................. 326/21, 22, 26, 326/82, 89, 90, 92

(56) References Cited

U.S. PATENT DOCUMENTS 4,085,411 * 4/1978 Genesi ..................................... 326/89
5,148,055 * 9/1992 Nohora ..................................... 326/89

FOREIGN PATENT DOCUMENTS 29 03 860 * 8/1980 (DE) .
0 007 622 * 2/1980 (EP) .
0 365 696 * 5/1990 (EP) .

OTHER PUBLICATIONS

Happacher, M, "Das Vernetzte Eigenheim," Sep. 5, 1995 Listed in Search Report.*

* cited by examiner

Primary Examiner—Michael Tokar
Assistant Examiner—Don Phu Le
(74) Attorney, Agent, or Firm—Kenyon & Kenyon

(57) ABSTRACT

Bus coupler for transformer-free transmission onto a bus appertaining to building system technology, in particular the European Installation Bus Association, ("EIBA") said bus carrying information, comprising active pulse and equalizing pulse, and energy. It is provided that the transmission valve of a transmission signal generator, in accordance with the function, is connected to at least one bus conductor via a capacitance, which is small relative to an imaginary capacitance acting as a short circuit for the active pulses of the information, it being the case that in a Miller circuit, in accordance with the function essentially further comprising a transistor, and a drive resistor, and two current amplifier circuits, this small capacitance is transformed into a sufficiently large capacitance in order to transmit active pulses in a sufficiently loss-free manner, and energy storage for the purpose of generating the equalizing pulse being effected in a further capacitance.

6 Claims, 1 Drawing Sheet

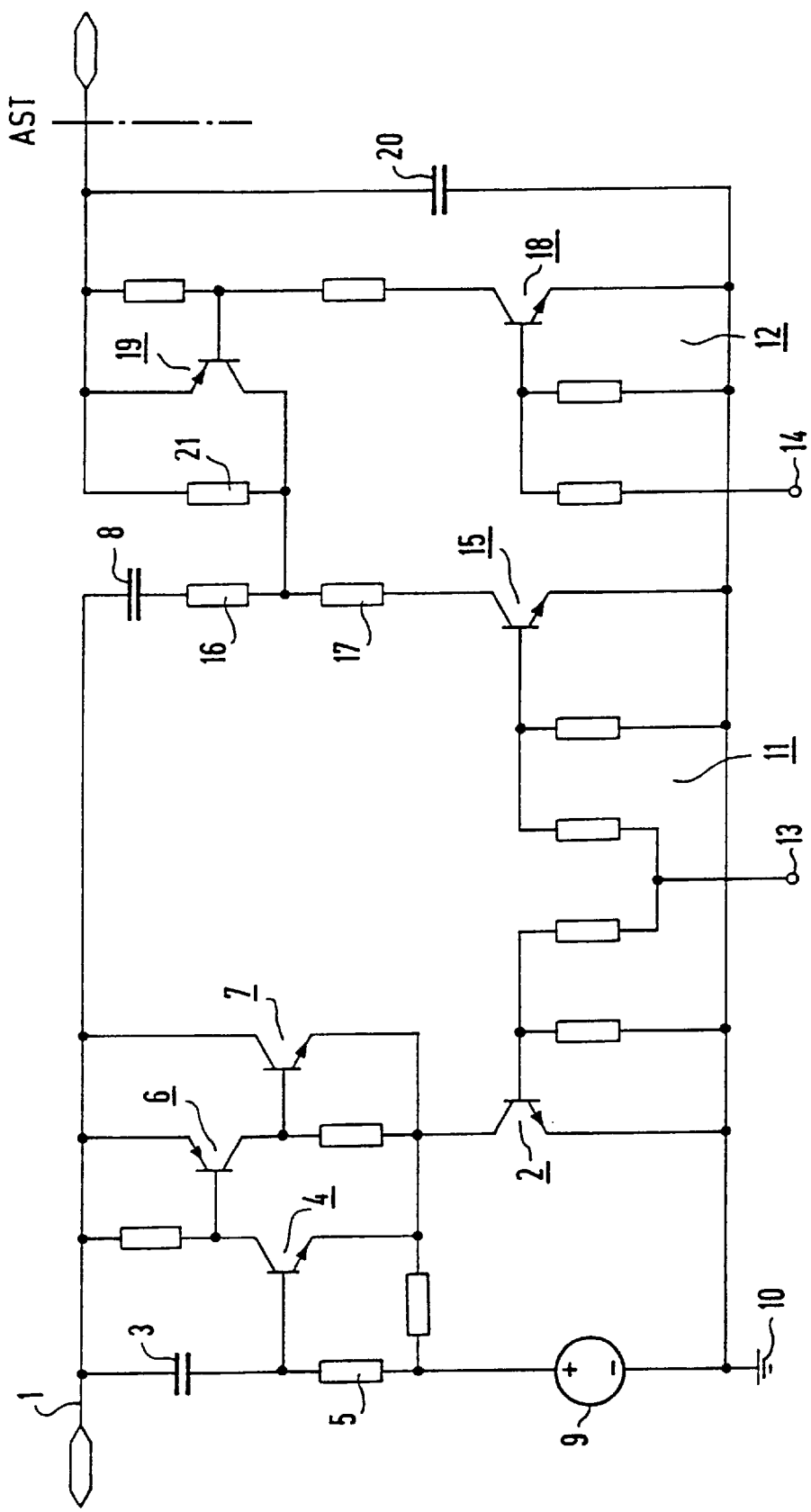

BUS COUPLER WITH TRANSFORMER-FREE TRANSMISSION

FIELD OF THE INVENTION

The present invention relates to a bus coupler for transformer-free transmission onto a bus carrying information and energy. The information carried by the bus coupled by the present invention consists of active pulse and, for reasons of bus efficiency, equalizing pulse for each bit/information. Such a bus appertaining to building system technology is used in particular by the European Installation Bus Association, ("EIBA").

SUMMARY OF THE INVENTION

It is advantageous to provide a bus coupler capable of integrating with all of the components of an integrated circuit that does not use conventional transformers.

An object of the present invention is to provide a bus coupler which, in conjunction with a simple circuit arrangement, transmits active pulse and equalizing pulse.

The object is achieved by means of a bus coupler according to the present invention. A transmission valve of a transmission signal generator is coupled, in accordance with the function, to a bus conductor via a capacitance, which may be small relative to an imaginary capacitance acting as a short circuit for the active pulses of the information. A Miller circuit serves, in conjunction with two current amplifier circuits, to transform the small capacitance into a sufficiently large capacitance. This sufficiently large capacitance permits the active pulses to be transmitted in a sufficiently loss-free manner. The size of the capacitance can thus be tailored to the respective requirements. Energy stored in a further capacitance is used to generate the equalizing pulse. The active pulse and equalizing pulse are generated by means of capacitances, which occupy less space than a bus coupler with transformers, and may easily be realized in an integrated circuit. In practice, a gain by a factor of 10 can be achieved per stage by the two current amplifier circuits, resulting in a total gain of the order of magnitude of 1000. Moreover, the gain achieved by the two amplifier circuits is in phase.

A capacitor for the small capacitance may be coupled by one pole to a bus conductor of a two-core bus and by its other pole to a voltage source via a high-value resistor. The voltage source may be chosen such that its voltage generates the desired voltage of the active pulse. The Miller circuit may be coupled, together with its amplifier circuits, to ground via the transmission valve of the transmission signal generator. In this embodiment, one bus conductor may carry a positive signal and one bus conductor a negative signal and the ground may, be arranged in a freely floating manner.

A further capacitor for the further capacitance for generating the equalizing pulse may be connected by one of its poles to a bus conductor and by its other pole to the voltage source. These networks are driven in accordance with the pulse shape of the information. Such an arrangement achieves a simple circuit. It is advantageous for the capacitor for the small capacitance and the further capacitor to be connected to the bus conductor of positive polarity.

BRIEF DESCRIPTION OF THE DRAWING

FIG. 1 illustrates an exemplary embodiment of a bus coupler according to the present invention.

DETAILED DESCRIPTION

The bus coupler according to FIG. 1 serves for transformer-free transmission onto a bus carrying information and energy, the information being composed of active pulses and equalizing pulses. In the exemplary embodiment, the bus coupler is connected to a bus conductor 1. A transmission valve 2 of a transmission signal generator is coupled, in accordance with the function, to at least one bus conductor 1 via a capacitance 3. The capacitance 3 is small relative to an imaginary capacitance which can act as a short circuit for the active pulses of the information. The small capacitance 3 is transformed into a sufficiently large capacitance in a Miller circuit, in accordance with the function essentially comprising the small capacitance 3, a transistor 4, a drive resistor 5, and two current amplifier circuits with a transistor 6 and a transistor 7. The capacitance is sufficiently large if it enables active pulses to be transmitted in a sufficiently loss-free manner. Energy storage for the purpose of generating the equalizing pulse is effected in a further capacitance 8.

In the exemplary embodiment, a capacitor for the small capacitance 3 is connected by one pole to a bus conductor 1 of a two-core bus and by its other pole to a voltage source 9 via a high-value resistor 5, which serves as the drive resistor. The voltage source 9 is chosen such that its voltage generates the desired voltage of the active pulse.

The Miller circuit with the transistor 4 is connected, together with its amplifier circuits with the transistors 6 and 7, to ground 10 via the transmission valve 2 of the transmission signal generator. A further capacitor for the further capacitance 8 for generating the equalizing pulse is connected by one of its poles to a bus conductor 1 via the charging resistor 16 and the resistor 21, which is connected in parallel with a transistor 19. The further capacitor is connected by its other pole to a capacitance 20 as voltage source for on-board electrical supply. Charging and discharging of the further capacitor with the further capacitance 8 are effected by means of driven networks 11, 12, which are driven via control inputs 13 and 14 in such a way that, given corresponding time constants, the pulse shape of the information is mapped. Thus, during a time period from t0 to t1, the driven network 11 can charge the further capacitance and form a pulse, and during a time period from t1 to t2, the driven network 12 can form an equalizing pulse.

The capacitor for the small capacitance 3 and the further capacitor for the further capacitance 8 are advantageously connected to the bus conductor 1 for positive polarity in the exemplary embodiment. The bus coupler operates as follows:

The small capacitance 3 is charged with a time constant C3×R5 to a voltage which results from a bus voltage on the bus conductor 1 by subtraction of the voltage of the voltage source 9. For example, the bus voltage may be 24 V and the voltage of the voltage source 9 may be 8 V, for example. A low-resistance connection to the bus conductor is available at the emitter of the transistor 7 in a momentary regard relative to the time constant via the Miller circuit comprising small capacitance 3, and also transistor 4 and drive resistor 5 in conjunction with the two current amplifier circuits with the transistor 6 and 7. This connection has a fixed voltage drop comprising the bus voltage, less the voltage the voltage source 9, of 8 V for example, less a base-emitter voltage of the transistor. The emitter is pulled to ground with the transmission valve for the duration of the active pulse, with the result that on the bus, independent of the bus voltage, the active pulse always has identical amplitudes of, in the exemplary embodiment, 8 V less the base-emitter voltage. The control input 13 of the driven network 11 feeds in the required voltage for the transmission valve 2. The active pulse is a HIGH pulse having a length of 35 µs in the case of the EIBA bus.

Driving at the control input 13 for the network 11 turns the transistor 15 on until a time t1, as a result of which the further capacitor 8 is charged, via the resistors 16 and 17 as charging resistors, to the bus voltage minus the voltage drop of the transistor 15. The charging time constant C8×(R16+ R17) is chosen such that the further capacitor 8 is fully charged at the end of t1. At the end of t1, an equalizing pulse is output to the bus. At the end of t1, the control input 14 of the network 12 is driven. That is a time period of 52.5 $\mu$s in the case of the EIBA bus. The transistor 18 is transferred into the on state by the control input 14, as a result of which the transistor 19 is also turned on. Since the transistor 15 was controlled into the off state at the end of t1, the further capacitor 8 with its charge, which it received during the time t1 is connected to the voltage across the user interface AST via the resistor 16. The voltage across the user interface may be 20 V, for example. Consequently, the bus is fed a voltage in the equalizing pulse 20 V−8 V=+12 V, which decreases to a voltage of less than 1 V with the time constant C8×R16 during the time period until t2 due to discharging of the further capacitor 8 in accordance with an exponential function. Given correct dimensioning, the energy stored in the further capacitor 8 corresponds to the energy that is otherwise stored in a customary transformer, with the result that the bus coupler is fully compatible with bus couplers with transformers that have been employed to date.

DC voltage for on-board electrical supply can be picked off at the capacitor 20, the charging circuit for the capacitor having been omitted for the sake of clarity. This charging circuit is not important for the generation of the transmission pulses.

All of the transistors mentioned here may be understood to be switches appertaining to IC technology. The capacitors and/or capacitances can be integrated in an integrated circuit.

What is claimed is:

1. A bus coupler for transformer-free transmission onto a bus, the bus carrying information including active pulse, equalizing pulse, and energy, comprising:

a transmission-valve of a transmission signal generator coupled to at least one bus conductor of the bus via a first capacitance, the first capacitance being small relative to an imaginary capacitance and acting as a short circuit for the active pulse;

a Miller Circuit including a transistor, a drive resistor, and two current amplifier circuits, the Miller Circuit transforming the first capacitance into a capacitance sufficient to transmit the active pulse in a substantially loss-free manner; and a second capacitance storing energy for generating the equalizing pulse.

2. The bus coupler according to claim 1, wherein the bus is a two-core bus, the bus coupler further comprising:

a first capacitor providing the first capacitance, the first capacitor being coupled by a first pole to the at least one bus conductor and by a second pole to a first voltage source via a high-value drive resistor, the first voltage source generating a desired voltage for the active pulse.

3. The bus coupler according to claim 1, wherein the Miller Circuit is coupled to ground via the transmission valve of the transmission signal generator.

4. The bus coupler according to claim 2, further comprising:

a second capacitor providing the second capacitance, the second capacitor being coupled by a first pole to the at least one bus conductor and by a second pole to a second voltage source via at least one resistor, the second voltage source for on-board electrical supply; and networks driven in accordance with a pulse shape of the information, the networks controlling a charging and discharging of the second capacitor in accordance with corresponding time constants.

5. The bus coupler according to claim 4, wherein the first capacitor and the second capacitor are coupled to a positive polarity bus conductor of the bus.

6. The bus coupler according to claim 4, wherein the bus pertains to building system technology, the building system technology being used by a European Installation Bus Association.

* * * * *